2,894,959
Patented July 14, 1959

2,894,959

4,5-EPOXYCYCLOHEXANE-1,2-DICARBONITRILES AND PROCESS OF PREPARING THE SAME

Benjamin Phillips, Charleston, and Paul S. Starcher, South Charleston, W. Va., assignors to Union Carbide Corporation, a corporation of New York No Drawing. Application December 17, 1956
Serial No. 628,552

4 Claims. (Cl. 260—348)

This invention relates to a new class of organic chemical compounds suitable for use as plasticizers and stabilizers for resin compositions. More particularly, this invention relates to 4,5-epoxycyclohexane-1,2-dicarbonitriles, a method for producing the same and to resin compositions containing the same.

The 4,5-epoxycyclohexane-1,2-dicarbonitriles of this invention can be represented by the general formula:

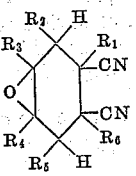

wherein $R_1$ through $R_6$ represent hydrogen atoms and lower alkyl groups containing from one through eight carbon atoms. The 4,5-epoxycyclohexane-1,2-dicarbonitriles characterized by the general formula above wherein $R_1$ through $R_6$ represent at least one member of the group consisting of hydrogen and lower alkyl groups; the total number of carbon atoms in $R_1$ through $R_6$ does not exceed twelve are preferred. Mono-alkyl and particularly mono-methyl substituted 4,5-epoxycyclohexane-1,2-dicarbonitriles are especially preferred.

The 4,5-epoxycyclohexane-1,2-dicarbonitriles have been found useful as plasticizers and stabilizers for the halogen-containing vinyl-type resins and particularly for the polyvinyl chloride resins and the vinyl chloride-acrylonitrile copolymer resins. Compositions comprising a halogen-containing vinyl-type resin and a 4,5-epoxycyclohexane-1,2-dicarbonitrile, have been found to be useful in preparing sheeted material for calendaring and laminating operations.

In preparing the 4,5-epoxycyclohexane-1,2-dicarbonitriles of this invention, a 4-cyclohexene-1,2-dicarbonitrile is reacted with peracetic acid or acetaldehyde monoperacetate at a temperature in the range of from 10° C. to 100° C. at atmospheric pressures. Preferably, the dinitrile is reacted with an organic solvent solution of peracetic acid or acetaldehyde monoperacetate. Typical solvent solutions which may be empolyed successfully in epoxidizing the dinitrile can be any of those disclosed in copending applications, Serial No. 303,152, filed August 7, 1952, and Serial No. 374,142, filed August 13, 1953.

Typical 4-cyclohexene-1,2-dicarbonitriles which can be readily employed in the process of this invention to produce a variety of 4,5-epoxycyclohexane-1,2-dicarbonitriles include:

1-methyl-4-cyclohexene-1,2-dicarbonitrile;
2,5-dimethyl-4-cyclohexene-1,2-dicarbonitrile;
2,4-dimethyl-4-cyclohexene-1,2-dicarbonitrile;
2,3-dimethyl-4-cyclohexene-1,2-dicarbonitrile;
2,6-dimethyl-4-cyclohexene-1,2-dicarbonitrile;
4,5-dimethyl-4-cyclohexene-1,2-dicarbonitrile;
2,4,5-trimethyl-4-cyclohexene-1,2-dicarbonitrile.

In carrying out the process of this invention for preparing the 4,5-epoxycyclohexane-1,2-dicarbonitriles, a typical unsaturated nitrile, such as, for example, 4-cyclohexene-1,2-dicarbonitrile, is reacted with a solution of an oxidizing agent such as peracetic acid, preferably in a solvent such as acetone at a temperature of from 30° C. to 40° C. over a period varying from one to three or four hours. The reaction takes place over a period of about 10 hours after which there is added to the reaction mixture a quantity of ethylbenzene merely as a "pot-boiler" and the reaction mixture is then distilled. After removal of the acetone solvent and the by-product, acetic acid, the product can be crystallized out of the ethylbenzene and filtered. If desired, recrystallization of the crude product from a solvent such as toluene can be employed in order to increase the purity of the product.

The following examples illustrate the novel 4,5-epoxycyclohexane-1,2-dicarbonitriles, the methods for making them, and the resin compositions containing the same.

In these examples, the analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, then drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses in the examples for determining epoxidant, i.e., peracetic acid or acetaldehyde monoperacetate, content can be performed, for example, by introducing one to 1.5 grams of a sample unknown epoxidant concentration into a flask containing a mixture of 60 milliliters of 50 weight percent aqueous sulfuric acid solution and five milliliters of a saturated potassium iodide solution. The flask is swirled to mix the solutions and then titrated immediately with a 0.1 N aqueous sodium thiosulfate solution to a colorless end point. From the titration data thus obtained, a determination of epoxidant content can be made.

In order to determine the acetic acid content of the reaction mixtures in the examples, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate, may be calculated from the previous sodium thiosulfate titration determination of epoxidizing agent content on the basis of two moles of acetic acid being formed from each mole of peracetic acid or acetaldehyde monoperacetate.

EXAMPLE 1

*Preparation of 4,5-epoxycyclohexane-1,2-dicarbonitrile*

To a solution of 0.356 mole of 4-cyclohexene-1,2-dicarbonitrile in acetone was added, over a period of 1.75 hours, a solution of peracetic acid (0.534 mole) in acetone at 30° C. to 40° C. After an additional 13-hour reaction period at 45° C., the reaction mixture was added to ethylbenzene and distilled. After removal of the acetone and acetic acid, the product crystallized out of the ethylbenzene. A 66 percent yield of crude product was obtained upon filtration. Recrystallization of the crude product from toluene gave a white crystalline product which melted at 130° C. and had a purity of 95 percent when calculated as 4,5-epoxycyclohexane-1,2-dicarbonitrile.

In an analogous manner, other epoxydicarbonitriles can be readily prepared, such as, for example, 4,5-epoxy-1-methyl-4-cyclohexene-1,2-dicarbonitrile;
4,5 - epoxy - 2,5 - dimethyl - 4 - cyclohexene - 1,2 - dicarbonitrile;
4,5 - epoxy - 2,4 - dimethyl - 4 - cyclohexene - 1,2 - dicarbonitrile;
4,5 - epoxy - 2,3 - dimethyl - 4 - cyclohexene - 1,2 - dicarbonitrile;
4,5 - epoxy - 2,6 - dimethyl - 4 - cyclohexene - 1,2 - dicarbonitrile;
4,5 - epoxy - 4,5 - dimethyl - 4 - cyclohexene - 1,2 - dicarbonitrile;
4,5 - epoxy - 2,4,5 - trimethyl - 4 - cyclohexene - 1,2 - dicarbonitrile.

This application is a continuation-in-part of application Serial No. 374,142, filed August 13, 1953, now abandoned.

What is claimed is:

1. As new compounds, 4,5-epoxycyclohexane-1,2-dicarbonitriles characterized by the general formula:

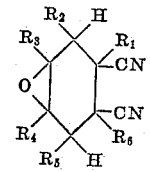

wherein $R_1$ through $R_6$ represent hydrogen atoms and lower alkyl groups containing from one through eight carbon atoms.

2. As a new compound, 4,5-epoxycyclohexane-1,2-dicarbonitrile.

3. A process for preparing a 4,5-epoxycyclohexane-1,2-dicarbonitrile which comprises reacting a 4-cyclohexene-1,2-dicarbonitrile and peracetic acid at a temperature in the range of from 10° C. to 100° C.

4. A process for preparing a 4,5-epoxycyclohexane-1,2-dicarbonitrile which comprises reacting a 4-cyclohexene-1,2-dicarbonitrile and acetaldehyde monoperacetate at a temperature in the range of from 10° C. to 100° C.

References Cited in the file of this patent

UNITED STATES PATENTS

| | | |
|---|---|---|
| 2,152,003 | Van Peski et al. | Mar. 28, 1939 |
| 2,393,129 | Tendick | Jan. 15, 1946 |
| 2,537,981 | Edwards | Jan. 16, 1951 |
| 2,720,497 | Hillyer | Oct. 11, 1955 |
| 2,732,357 | Sprung | Jan. 24, 1956 |